Nov. 29, 1932.  P. B. SCHUSTER  1,889,385
METHOD OF AND APPARATUS FOR INDICATING TEMPERATURES OF MOVING BODIES
Filed Jan. 9, 1929  2 Sheets-Sheet 1
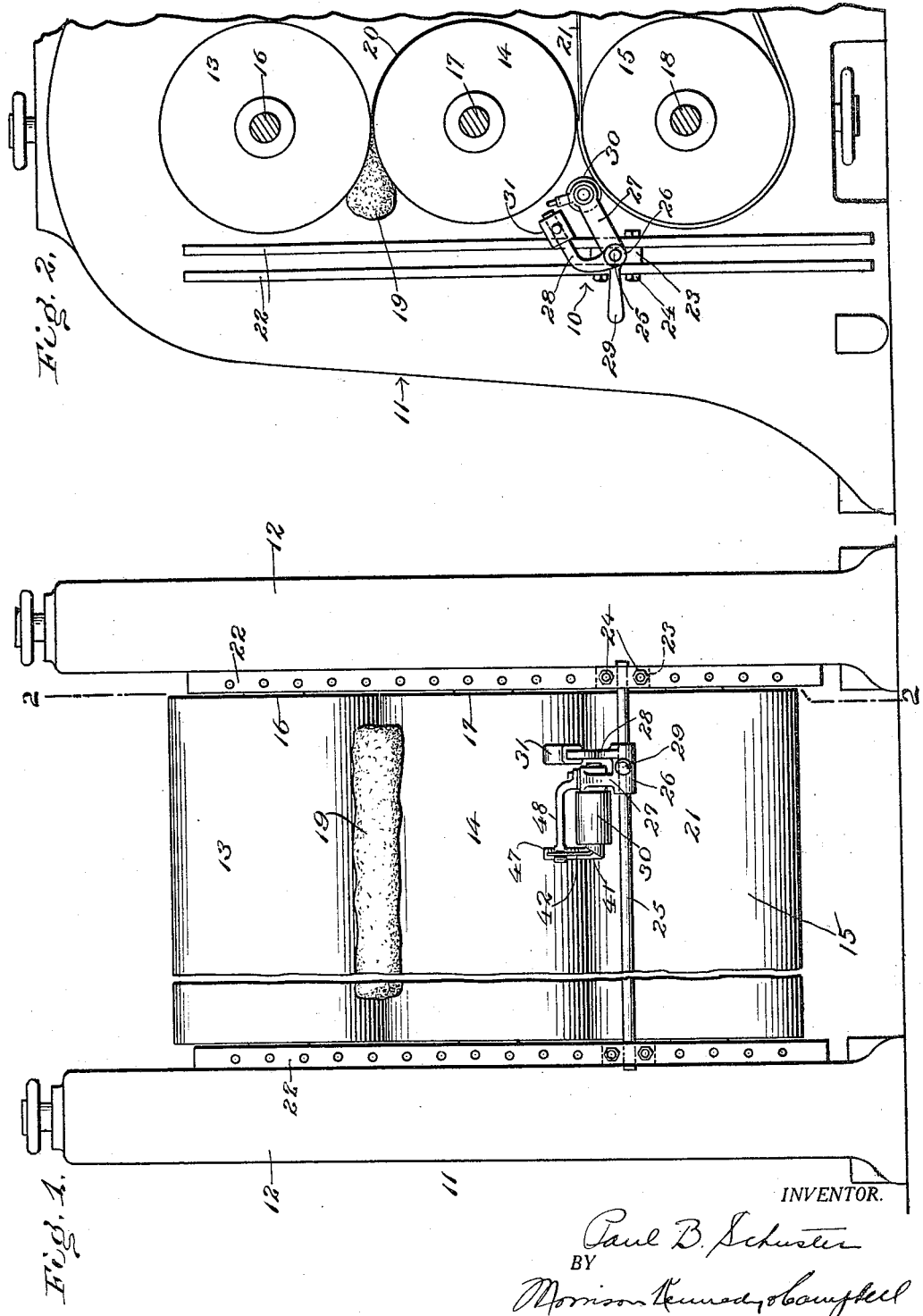
INVENTOR.
Paul B. Schuster
BY
Morrison Kennedy Campbell
ATTORNEYS Nov. 29, 1932.　　　P. B. SCHUSTER　　　1,889,385
METHOD OF AND APPARATUS FOR INDICATING TEMPERATURES OF MOVING BODIES
Filed Jan. 9, 1929　　2 Sheets-Sheet 2
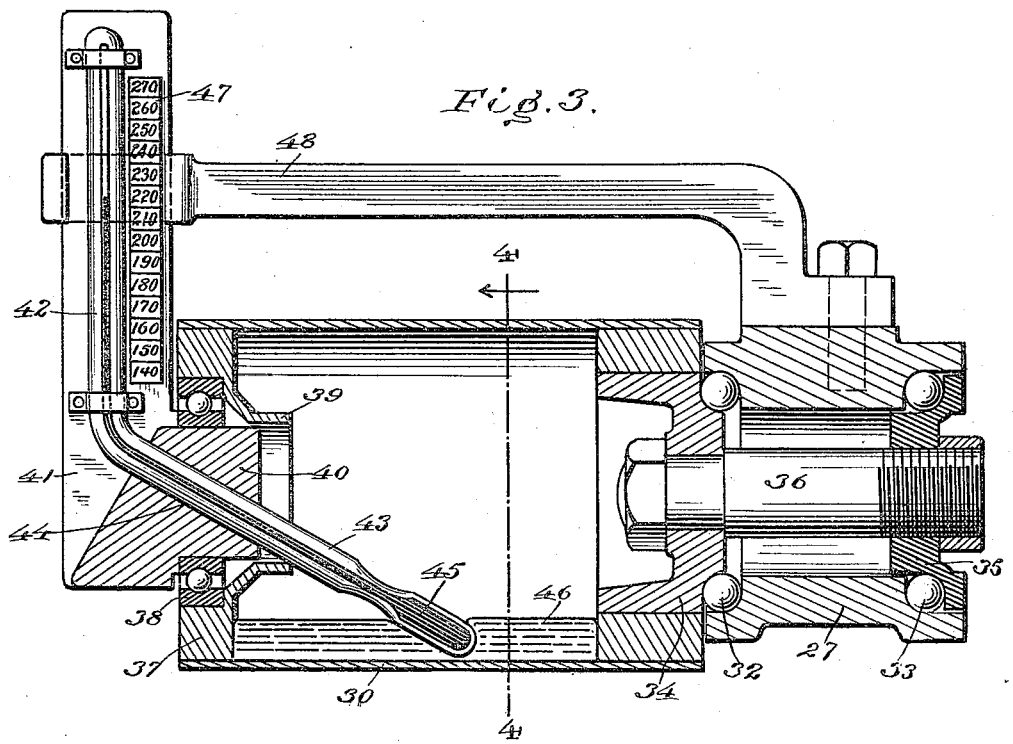
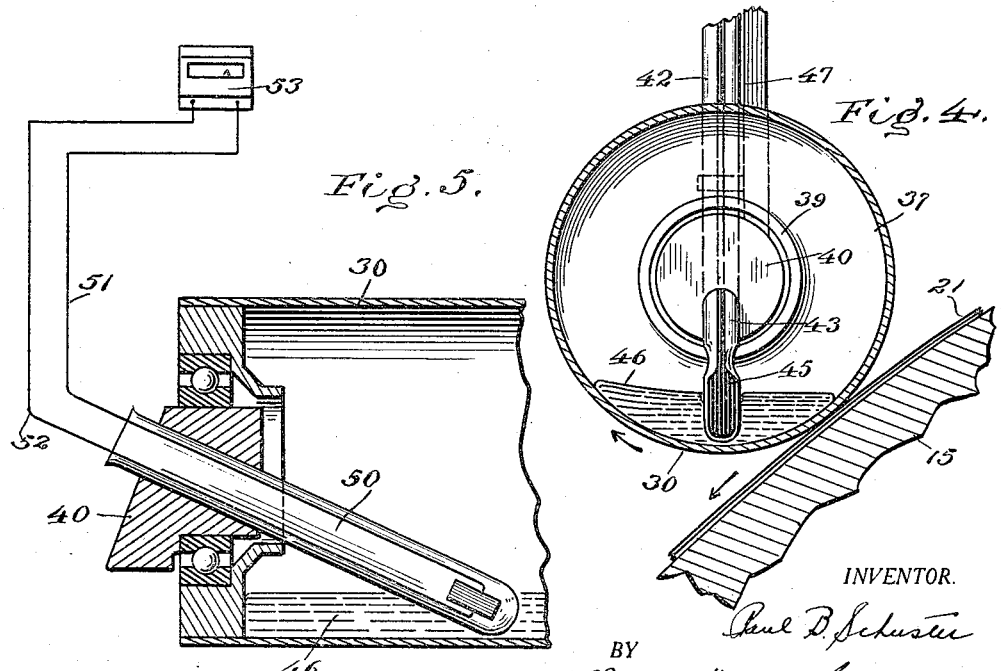
INVENTOR.
Paul B. Schuster
BY
ATTORNEYS Patented Nov. 29, 1932

1,889,385

UNITED STATES PATENT OFFICE

PAUL B. SCHUSTER, OF AKRON, OHIO, ASSIGNOR TO THE MAGNETIC GAUGE COMPANY, OF AKRON, OHIO, A CORPORATION OF OHIO

METHOD OF AND APPARATUS FOR INDICATING TEMPERATURES OF MOVING BODIES

Application filed January 9, 1929. Serial No. 331,357.

This invention is directed to a new method and a novel apparatus for indicating the temperatures of moving bodies and, while capable of more general application, is especially adapted for use in connection with the manufacture of rubber or rubberized sheet materials and the like.

In the production of sheet rubber or rubberized fabric, such as are used in the manufacture of inner tubes and pneumatic tires, plastic gum stock is supplied to a calender machine in which it is pressed into sheet form between rotating rolls and then carried off in that form or else rolled into or upon a sheet of fabric or cord material to impregnate or coat the same with rubber, all as well known in the art. The plastic gum stock is brought from a mixing mill to the calender in a heated condition, and in order to facilitate its working, the calender rolls are heated by steam. Various factors, however, cause fluctuations in the operating temperatures, and if these fluctuations go either above or below certain limits, satisfactory results will not be obtained. Thus if the stock becomes overheated, it will be burned or scorched and therefore rendered unfit for use. Furthermore, an excessive variation in the roll temperatures will increase or decrease the thickness of the rubber coating applied to the fabric, or may cause cold checking and blooming of the rubber. Heretofore, there has been no way of knowing at all times the actual working temperature of the rolled sheets, and consequently considerable quantities of material have been run off the calender before inspection showed it to be defective, resulting in waste of material or inferior stock and loss of time and labor. The present invention overcomes these objections of the prior practice by providing means for determining the temperature of the rubber sheet as it is progressively formed by the calender rolls.

More specifically, the invention contemplates a temperature indicator comprising a heat conducting member which is held in surface contact with the traveling or progressively formed sheet of rubber whereby to attain the same temperature, and a thermo-responsive element adapted to be influenced by temperature variations of said heat conducting member. In the preferred form of the invention illustrated, the heat conducting member is in the nature of a hollow cylindrical roller and contains a body of mercury in which a thermometer bulb is disposed, the stem of the thermometer extending outwardly from one end of the roller to give readily visible indications of the temperature changes which take place in the body of mercury. In an alternative embodiment of the invention, the thermometer is replaced by a thermo-couple which may be connected with a gage, recording instrument, or automatic controlling means of any desired type.

The foregoing and other objects, features, and advantages of the invention will be more fully appreciated and better understood from the following description in connection with the accompanying drawings, wherein the invention has been shown by way of illustration, and wherein:

Fig. 1 is a front elevation of a calendar machine equipped with a temperature indicator in accordance with invention;

Fig. 2 is a vertical transverse sectional view on line 2—2 of Fig. 1;

Fig. 3 is a vertical longitudinal sectional view on a larger scale through the novel temperature indicator per se;

Fig. 4 is a transverse sectional view on line 4—4 of Fig. 3; and

Fig. 5 is a fragmentary longitudinal sectional view through a modified form of the invention.

Referring now to the drawings in detail, it will be seen that the novel temperature indicating means 10 has been shown in conjunction with a calendar machine 11, which comprises a pair of heavy cast side frames 12 spaced from each other and rotatably supporting between them a series of heated rolls 13, 14, and 15. These rolls are usually disposed one above the other with their respective shaft 16, 17, and 18 parallel with each other and substantially horizontal, as shown in Fig. 2. A bank of unvulcanized gum stock 19 (previously mixed and heated) is supplied to the pass between the upper roll 13 and the intermediate roll 14, and as these rolls rotate in opposite directions the rubber is rolled into a thin sheet 20 which is carried around to the lower side of the roll 14. Here, in the example illustrated, the rubber sheet 20 is applied by a "friction" or "skim coat" operation to a sheet 21 of fabric, cord, or lining material, as the case may be, as they pass together between the rolls 14 and 15, after which the composite sheet is run through other calendar rolls or is wound up to be stored until needed. The rolls 13, 14, and 15 are usually hollow and are internally heated by steam or hot water, so as to maintain the gum stock in the desired plastic condition.

In the present instance, the side frames 12 are provided on their inner sides with spaced vertical ribs 22 between which blocks 23 are adjustably held by bolts 24, said blocks constituting supports for the opposite ends of a rod or bar 25 which extends horizontally in front of the machine, as best shown in Fig. 1. A bracket 26 is mounted to slide and to rock on the rod 25, said bracket including two inwardly extending arms 27 and 28, and an outwardly extending handle 29. The inner end of the arm 27 carries a heat conducting member 30 which is adapted to be held yieldingly in contact with the surface of the rubber sheet 20 as the latter is rolled upon the sheet 21 and passes around the front of the lower roll 15, and the pressure of this heat conducting member against the sheet material may be varied by adjustment of a weight 31 which is slidable on the arm 28.

In the illustrated embodiment, the heat conducting member 30 is in the form of a hollow cylindrical roller, the periphery of which bears against the traveling rubber or rubberized sheet, and which is journaled for free rotation in ball-bearings 32 and 33 mounted in the end of the arm 27 (Fig. 3). This mounting is effected by a raceway 34 secured in one end of the roller 30 and clamped with reference to another raceway 35 by means of a substantial stud 36. The other end of the roller 30 is fitted with a bushing 37 which is centrally counterbored for the accommodation of a ball-bearing 38, inwardly of which is an annular flange 39 for a purpose to be hereinafter described. The inner race of the ball-bearing 38 is attached to a fixed hub member 40 having at its outer end an up-standing plate 41 which constitutes a support for a thermometer tube 42 and which is held against rotation by a cross arm 48 secured to the bracket arm 27. As shown, the thermometer tube 42 is bent intermediate its ends to provide an inclined portion 43 which extends through a bore 44 in the hub member 40 and into the interior of the roller 30, where its bulb 45 is disposed close to the bottom thereof and is immersed in a body of mercury 46. Its own weight will keep the mercury in the bottom of the roller as the latter rotates, but the annular flange 39 will guard against leakage of the mercury through the ball-bearing. By virtue of its surface contact with the sheet material, the roller 30 will be heated to the same temperature as the material, and this heat, being absorbed by the mercury bath 46, will affect the thermometer bulb 45 and give a visible indication of the exact temperature on a scale 47 attached to the plate 41. While such an exact temperature indication is desirable for obvious reasons, it is not absolutely essential, as for any particular stock definite limits could be fixed and indicated on the scale to guide the attendant in operating the calender.

In using the device, the calender 11 is put into operation and the roller 30 is laid upon the material at the place shown in Figs. 2 and 4 or at some other desired place. The progressive advance of the rubber stock causes the roller 30 to rotate and to transmit the heat of the sheet to the body of mercury 46, the temperature being ascertainable by a reading of the thermometer 42. By shifting the bracket 26 and its associated parts axially on the rod 25, the temperature of the formed sheet may be obtained at various points in its width, if desired. Thus, the attendant is constantly advised of the working temperature of the sheet stock as it is progressively formed, and if he notes an increase or a decrease in the temperature beyond predetermined limits, he can at once determine and correct the cause of the excessive variation and thus prevent the waste and loss previously alluded to.

Any other type of thermo-responsive device may be employed in place of the thermometer and its mercury bath, and instead of giving a visible indication, it may be arranged to actuate an audible signal or alarm, or some automatic control valve or the like. For example, in Fig. 5 the roller 30 has been shown as provided with a thermo-couple 50 of well-known form immersed in the mercury bath 46, whereby the fluctuations in temperature will be translated into electrical energy which through wires 51 and 52 will be indicated or recorded on a suitable meter 53.

The invention is of extremely simple construction and capable of being produced and installed with economy, and will be durable and efficient in service. While it has been shown and described as operating directly on the sheet material, which is most desirable because of the direct temperature indication, the roller can, of course, be run in contact with one of the calender rolls, if that should be deemed expedient. Furthermore, the invention is not restricted to use with a calender, but in its broader aspects may be used for determining the temperature of any relatively movable or traveling body. In fact, the invention is susceptible of numerous modifications in the arrangement of parts and details of construction, as well as modes of application, and the right is herein reserved to make such changes as fall within the scope of the appended claims without departing from the spirit of the invention.

The words "indicator" and "indicating" occurring in the appended claims are used in their broadest sense and are intended to cover any form or manner of indication, whether a visual indicator, alarm or signal, recording instrument, or otherwise.

Having thus described my invention, what I claim is:

1. The method of progressively determining the temperature of a traveling web of sheet material, which consists in holding in continuous direct frictionless contact with the traveling sheet material a relatively movable heat conducting member subject only to the heat of the traveling sheet material, and measuring variations of temperature of said member.

2. The method of progressively determining the temperature of a traveling web of sheet material, which consists in transferring heat from the traveling sheet material continuously by direct conduction and in the absence of frictional heat to a thermo-responsive indicator.

3. A temperature indicator comprising a heat conducting member adapted to be arranged in direct frictionless contact with a moving body, and indicating means responsive to temperature changes in said heat conducting member.

4. A temperature indicator comprising a heat conducting roller adapted to be arranged in direct rolling contact with the surface of a moving body, and indicating means responsive to temperature changes in said heat conducting roller.

5. A device of the class described comprising, in combination, a heat conducting roller adapted to be supported in direct rolling contact with a relatively movable body, and thermo-responsive means influenced by temperature variations of the roller.

6. A device of the class described comprising, in combination, a hollow heat conducting roller adapted to be supported in rolling contact with a relatively movable body, a heat conducting fluid disposed in the hollow of said roller, and a thermo-responsive device partly immersed in said heat conducting fluid.

7. A device of the class described comprising, in combination, a hollow heat conducting roller having a fixed hub at one end and adapted to be supported in rolling contact with a relatively movable body, a body of mercury in the hollow of said roller, and a thermometer extending outwardly through the fixed hub, said thermometer having a bulb immersed in the body of mercury.

8. Apparatus for progressively indicating the temperature of a layer or web of sheet material progressively advanced through the apparatus, comprising a heat conducting member, means for yieldingly holding said heat conducting member in contact with one surface of the sheet material, and thermo-responsive means for indicating temperature changes in the heat conducting member.

9. Apparatus for progressively indicating the temperature of a layer or web of sheet material progressively advanced through the apparatus, comprising a heat conducting roller, means for supporting said roller yieldingly in rolling contact with one surface of the sheet material whereby to transfer heat therefrom, and temperature indicating means responsive to temperature changes in said heat conducting roller.

10. In combination with a calender machine or the like including a roll for operating on sheet material, a temperature indicator comprising a heat conducting member yieldingly disposed in opposition to the roll and in direct contact with the sheet material passing over the roll, and a thermo-responsive device responsive to temperature changes in said heat conducting member.

11. In combination with a calender for progressively forming a layer or web of rubber or rubberized sheet material, a temperature indicator embodying a heat conducting member arranged to make direct contact with the traveling sheet material.

12. In combination with a calendar for progressively forming a layer or web of rubber or rubberized sheet material, a temperature indicator embodying a heat conducting member in the form of a roller, and means for supporting the roller yieldingly in direct contact with the traveling sheet material.

13. In combination with a calendar for applying rubber in a plastic condition to a traveling web of fabric or cord material, a temperature indicator embodying a rotatable heat conducting member arranged to run in direct contact with the rubberized material.

In testimony whereof, this specification has been duly signed by:

PAUL B. SCHUSTER.